United States Patent [19]
Bonafous

[11] 3,990,675
[45] Nov. 9, 1976

[54] BUTTERFLY VALVE

[75] Inventor: Maurice Bonafous, Gurmencon, France

[73] Assignee: Applications Mecaniques et Robineterie A.M.R.I., Paris, France

[22] Filed: Dec. 10, 1974

[21] Appl. No.: 531,345

[30] Foreign Application Priority Data
Dec. 11, 1973 France ............... 73.44229

[52] U.S. Cl. .................. 251/148; 251/306; 137/375
[51] Int. Cl.² ..................... F16K 1/22
[58] Field of Search ............. 137/375; 251/306, 148, 251/305, 307, 308; 285/110, 335

[56] References Cited
UNITED STATES PATENTS

| | | | |
|---|---|---|---|
| 2,726,103 | 12/1955 | Slattery | 285/110 |
| 2,867,238 | 1/1959 | Wilfert | 251/305 X |
| 3,192,945 | 7/1965 | Blakeley | 137/375 |
| 3,360,283 | 12/1967 | Guthrie | 285/235 X |
| 3,453,006 | 7/1969 | Levake | 285/235 X |
| 3,589,678 | 6/1971 | Magoon | 251/306 |
| 3,667,726 | 6/1972 | Church et al. | 251/306 X |
| 3,750,698 | 8/1973 | Walchle et al. | 137/375 |
| 3,782,684 | 1/1974 | Stephens et al. | 251/306 |
| 3,825,030 | 7/1974 | Kalsi | 137/375 |

*Primary Examiner*—William R. Cline
*Attorney, Agent, or Firm*—Haseltine, Lake & Waters

[57] ABSTRACT

A butterfly valve for pipes having smooth ends comprising a body constituted by a metal casing of generally tubular shape with two dimensional bosses provided with coaxial passages. A layer of elastomer material externally and internally envelops the totality of the metal casing. Two shafts are rotatably mounted in the coaxial passages and support a butterfly within the body. The body includes at one of the extremities thereof an end portion which permits connection of the valve to a pipe by interfitting thereof. The other end of the body can be connected in various ways with the other pipe either as a male or a female fitting with associated annular lips.

12 Claims, 7 Drawing Figures

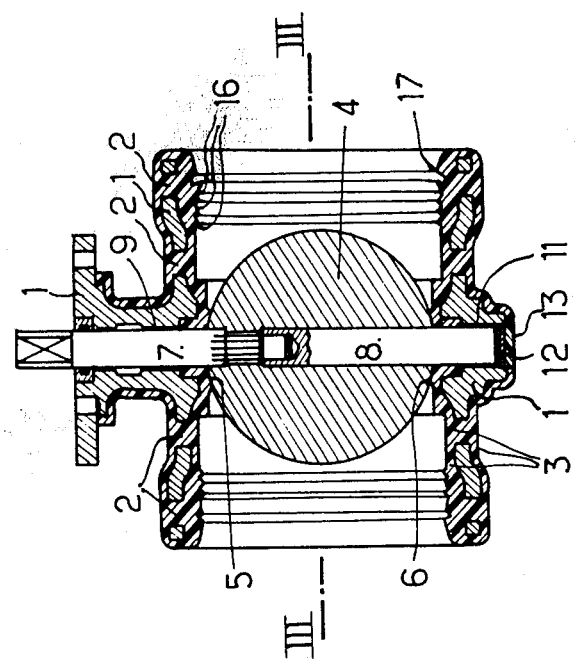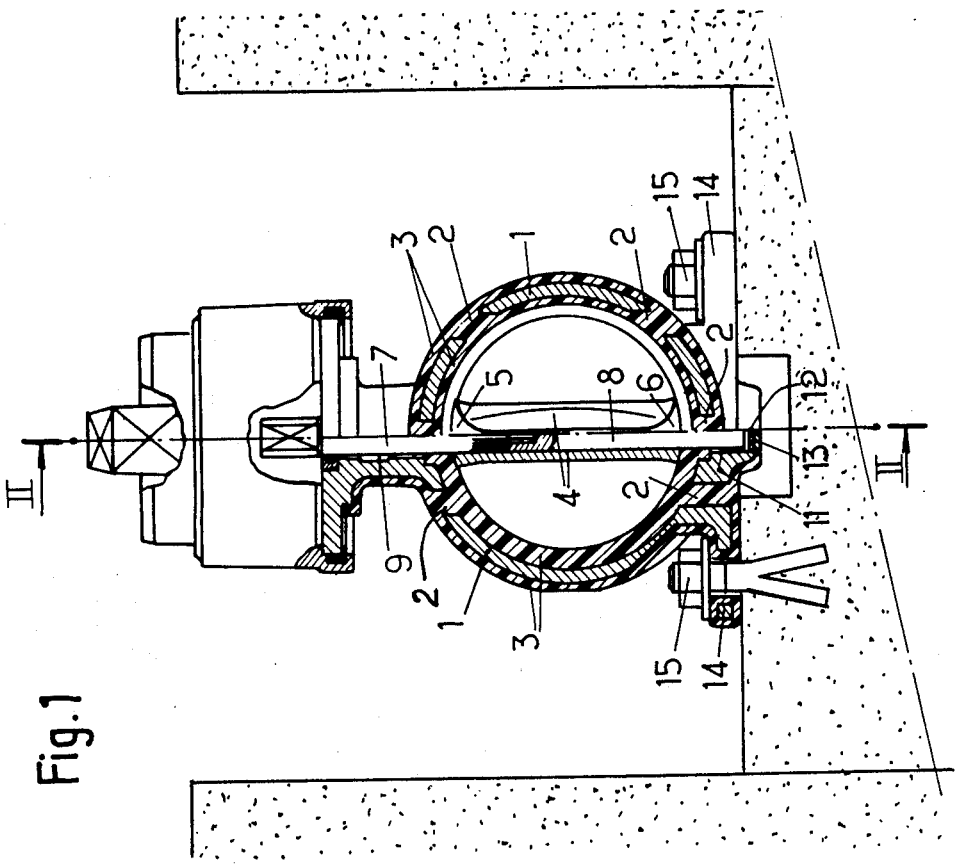

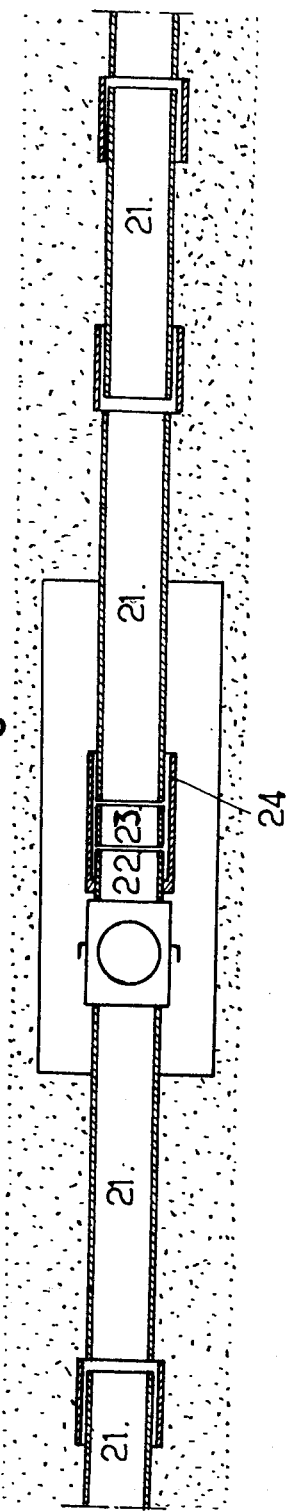
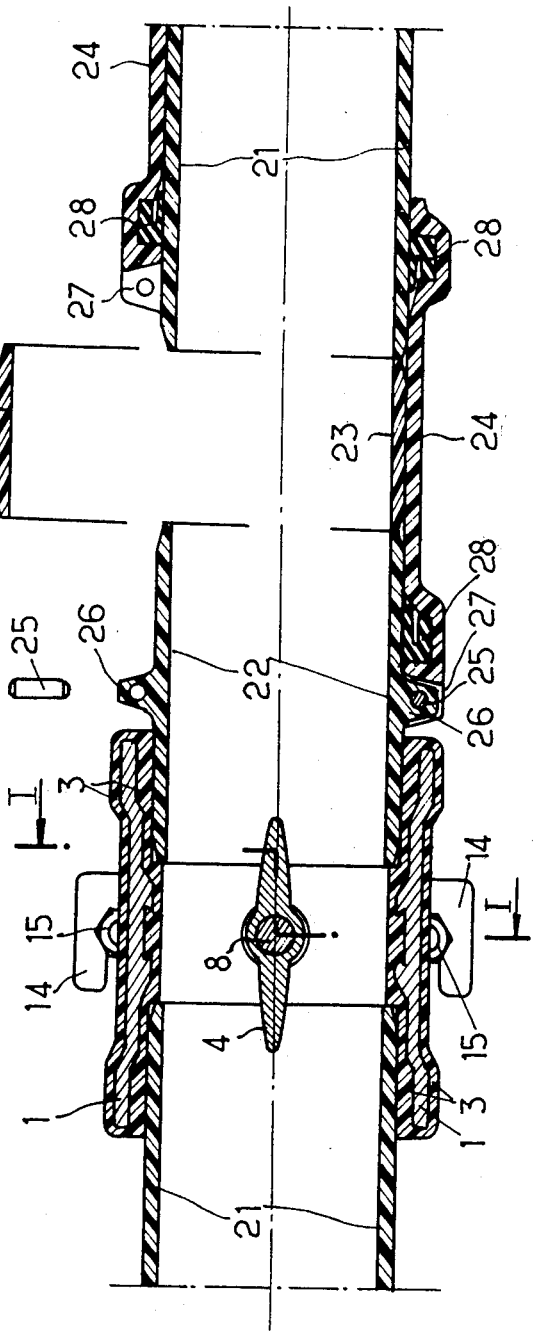

BUTTERFLY VALVE

The invention relates to butterfly valves for mounting in the smooth connecting-pieces of pipes.

In the present state of the known art, numerous types of butterfly valves exist which are intended to be connected to piping by flanges, screwthreads or welding. But the recent development of pipes made from plastics material, for example polyvinyl chloride or P.V.C. and tubes made from fibrocement, makes butterfly valves intended to be connected to these pipes very desirable and it is the object of the invention to fulfil this new need.

Furthermore, the invention relates to a butterfly valve which is liquid-tight both against leakages of liquid conveyed in the pipe and against the entry of external fluid, for example to prevent the pollution of drinking water by underground water which is always suspect.

The invention also relates to a butterfly valve whose metal casing is completely covered internally and externally with a polymer in order to prevent corrosion on the one hand and the pollution of the liquid conveyed on the other hand.

Finally, the invention also relates to a butterfly valve whose positioning and removal are easy and quick, without having to touch the piping, which is a considerable advantage especially when said piping is buried.

Consequently, the butterfly valve according to the invention comprises a metal casing rough-cast with holes passing therethrough and covered internally and externally with elastomer filling said holes and a butterfly member in the form of a disc with two spherical segments of coated metal or reinforced plastics, mounted on two splined half-shafts rotating in bearings which are preferably self-lubricating. The butterfly valve according to the invention may comprise male and/female connecting-pieces gripping the piping by fitting or by adhesives or by couplings and the double seal is ensured by the annular lips of said elastomer, namely lips having a steep side opposite the inside of the piping and at least one lip having a steep side opposite the outside of the piping.

According to another feature of the invention, the butterfly valve may co-operate with a sleeve and a cylindrical spacing member housed in a sleeve sliding on the pipework and locked. After unlocking, sliding of the sleeve on the pipework releases the spacer member and the valve and sleeve may be released by sliding.

Embodiments of the invention will be described hereafter as non-limiting examples, referring to the accompanying drawings in which:

FIG. 1 is a section at right-angles to the axis, along the broken line I—I of FIG. 3, of a butterfly valve according to the invention;

FIG. 2 is a vertical axial section on line II—II of FIG. 1;

FIG. 3 is a horizontal axial section on line III—III of FIG. 2, and also showing said boss, spacing member and sleeve;

FIG. 4 shows in plan view, the arrangement of FIG. 3 and of the corresponding buried pipe;

Figure 5:
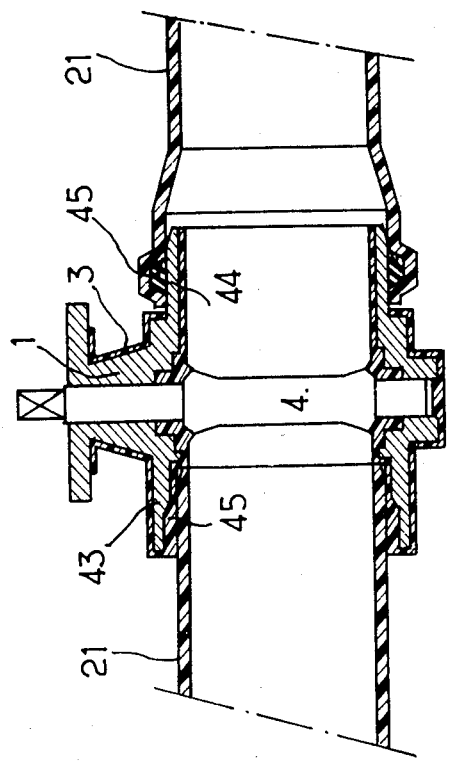
FIGS. 5 and 6 show diagrammatically connections between valves according to the invention and pipework, FIG. 5 by adhesives and FIG. 6 by couplings, with female connecting-pieces on the left in both figures and male connecting-pieces on the right in both figures.

With reference to FIGS. 1 and 2, the valve according to the invention comprises a metal casing 1, of general cylindrical shape with two diametral bosses for the passage of shafts; this metal casing comprises, from the foundry, a plurality of holes 2 passing therethrough and it is only machined for the passage of said shaft. The metal casing 1 is coated internally and externally, for example by moulding, with an elastomer 3, which fills the holes 2: the simplicity and efficiency with which the invention resolves the difficult technical problem of joining the elastomer and metal will be noted. The butterfly 4 made from coated metal or reinforced plastics is in the shape of a disc with two spherical segments 5 and 6 and it is mounted on two splined half-shafts 7 and 8 rotating in two self-lubricating bearings 9 and 11 in the casing 1. The bottom of the lower passage is closed by an expandable stopper 12 and by an elastomeric stopper 13 stuck in place. The valve is mounted by lugs 14 comprising holes and studs 15 (FIGS. 1 and 3). To ensure a seal against leakages, i.e. from inside the piping outwards, the elastomer 3 of the valve is provided with several annular lips 16 (in this case three) which are asymmetric, the steep side being directed towards the butterfly 4. To ensure a seal against the entry of liquid, i.e. from the outside of the pipe inwards, the elastomer 3 of the valve is provided with at least one other annular lip 17, which is asymmetric, the steep side being directed outwards. The lips shown in FIG. 2 are internal for a female connecting-piece, naturally, they are external for a male connecting-piece.

In FIGS. 3 and 4, it will be seen that the valve of FIGS. 1 and 2 is connected to a buried pipe 21, at one end directly (on the left in FIGS. 3 and 4) and at the other end by a boss 22 and a spacing member 23 housed in a sliding sleeve 24, all made from plastics material, for example PVC.

In the operating position (shown at the bottom in FIG. 3), the sleeve 24 is locked by two pins 25 passing through lugs 26 in the sleeve 22 and lugs 27 in the sleeve 24 and the seal is ensured by two annular gaskets 28 of the sleeve 24. To remove the valve, the pins 25 are removed, the sleeve 24 is slid towards the right which releases the spacing member 23 (as shown at the top in FIG. 3), the boss 22 and the valve may then be removed without having to touch the buried piping 21. The invention thus makes it possible to replace a buried valve quickly and easily.

Figure 6:
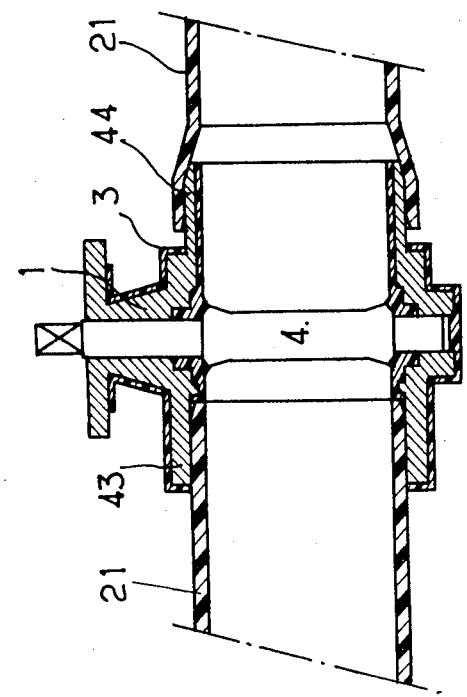

As shown in FIGS. 5 and 6, the valve according to the invention may be connected to the piping 21 by one or two female connecting-pieces 43 (on the left in FIGS. 5 and 6) or male connecting-pieces 44 (on the right in the figures) by sticking (FIG. 5) or by connections 45 (FIG. 6), or by simple fitting (as already described with reference to FIG. 3). It will be noted that the design of the valve allows a clearance of the piping inside the valve body: it becomes unnecessary to adjust the length of pipework exactly at the time of laying, which constitutes an appreciable advantage of the invention.

Figure 7:
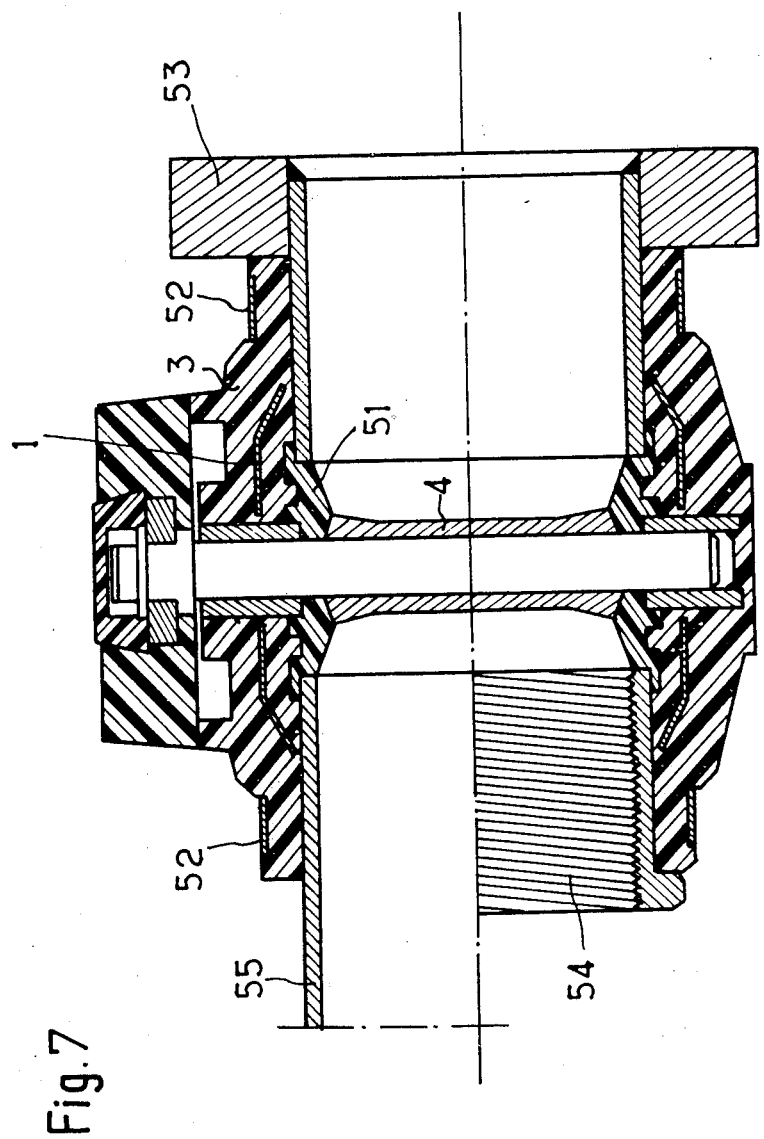
FIG. 7 shows another embodiment of the invention with a flange connection on the right, a screwthreaded connection at the bottom on the left and a smooth connection at the top on the left.

In the embodiment illustrated in FIG. 7, the metal casing 1 is relatively reduced and completely embedded in relatively hard elastomer 3, which forms a valve body and houses a seat 51 of relatively flexible elastomer. The valve may co-operate by means of anchoring collars 52 with a flanged connection 53 or with a screwthreaded connection 54 or directly with a pipe 55. It will be noted that the structure of this valve may allow a certain angular misalignment of the piping without operating disorders, which to a great extent facilitates the laying of pipework and thus constitutes a considerable advantage of the invention.

I claim:

1. A butterfly valve for pipes having smooth ends, said valve comprising a body constituted by a metal casing of generally tubular shape with two integral diametral bosses extending generally radially outwardly therefrom, said bosses being respectively provided with two coaxial passages, a layer of elastomer material externally and internally enveloping the totality of said casing and substantially externally the totality of said bosses, a butterfly valve disc, two shafts supporting said butterfly valve disc and rotatably mounted in said passages, and means for pivoting and sealing said shafts in said passages, said body including at one of the extremities thereof an end portion permitting connection of the valve to a pipe by interfitting therewith.

2. A valve as claimed in claim 1 wherein said elastomer material is relatively hard, said valve further comprising a seat for said butterfly valve disc supported by the elastomer covered body, said seat being constituted of a relatively flexible elastomer.

3. A valve as claimed in claim 1, in which said metal casing is provided with through holes which are filled with said elastomer material.

4. A valve as claimed in claim 1, in which said casing is machined solely for the passages for said shafts and is covered with said elastomer material by moulding.

5. A valve as claimed in claim 1 wherein said end portion comprises a male connection.

6. A valve as claimed in claim 1 wherein said end portion comprises a female connection.

7. A valve as claimed in claim 1 herein said elastomer material includes at least one asymmetrical lip for sealing an associated pipe end.

8. A valve as claimed in claim 7 wherein said lip is annular and has a steep side facing the butterfly valve disc to provide sealing of the interior of the associated pipe towards the outside.

9. A valve as claimed in claim 7 wherein said lip is annular and has a steep side facing towards the interior of an associated pipe to provide sealing from the outside to the inside of the pipe.

10. A valve as claimed in claim 7 wherein the end portion is a male portion and a plurality of said lips are externally disposed on said male portion.

11. A valve as claimed in claim 7 wherein the end portion is a female portion and a plurality of said lips are internally disposed on said female portion.

12. A valve as claimed in claim 1 in combination with a tubular boss member engaging said body, a tubular spacer, a sleeve surrounding and engaging said boss member and tubular spacer to said body, said sleeve slidably receiving one of said pipes, and means for lodging said sleeve on said tubular boss member.

* * * * *